Figure 1:
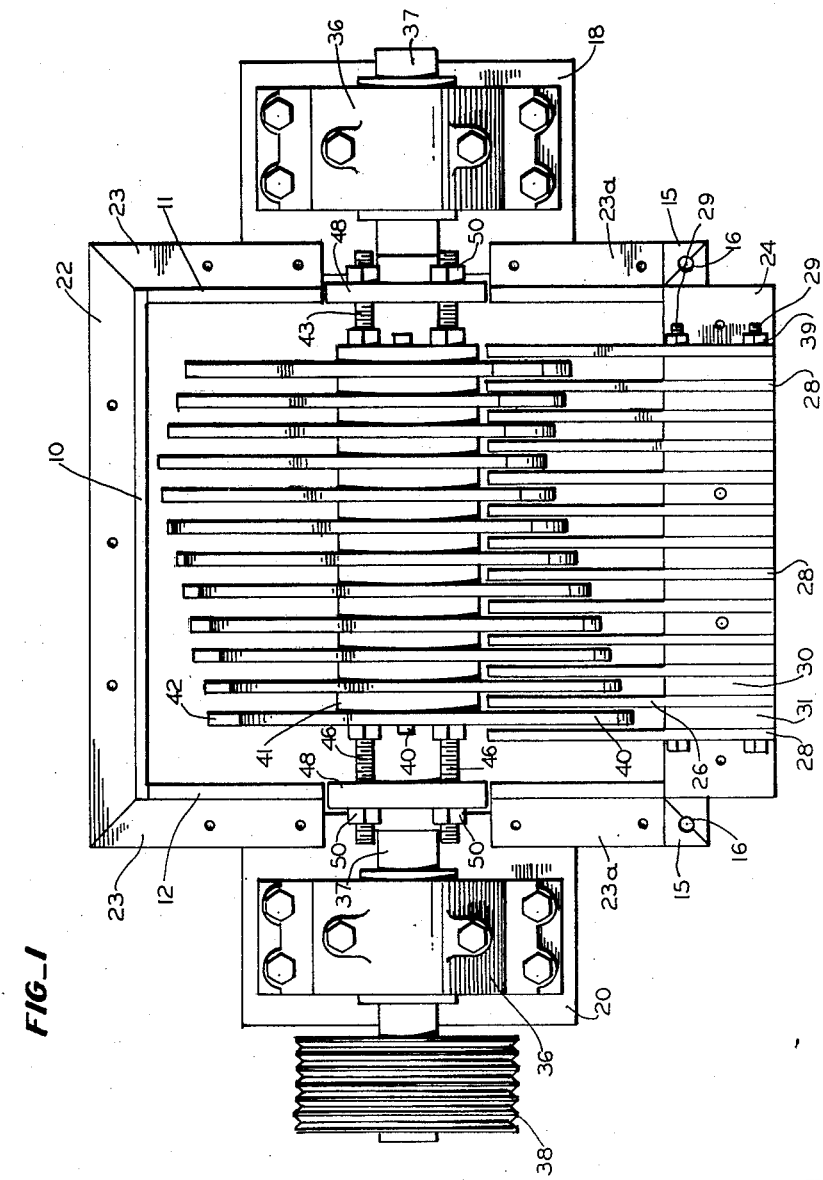

Jan. 19, 1965  T L. WHALEY  3,166,256
BARK CRACKER

Filed Jan. 18, 1963  3 Sheets-Sheet 2

INVENTOR.
T.L. WHALEY
BY

ATTORNEY

Jan. 19, 1965   T L. WHALEY   3,166,256
BARK CRACKER
Filed Jan. 18, 1963   3 Sheets-Sheet 3
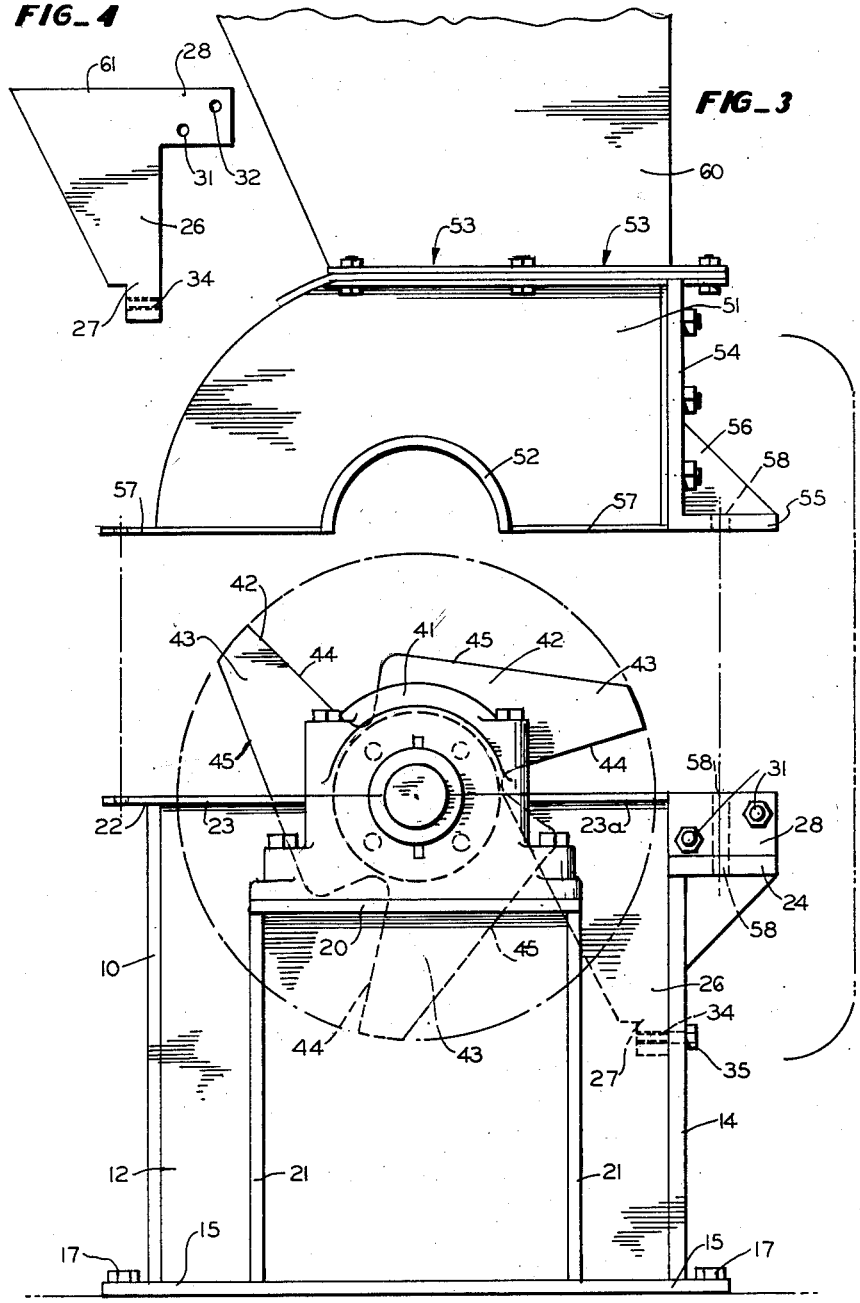
FIG_4
FIG_3
INVENTOR.
T L. WHALEY
BY
ATTORNEY United States Patent Office 3,166,256
Patented Jan. 19, 1965

3,166,256
BARK CRACKER
T. L. Whaley, Redding, Calif., assignor to Scott Lumber Company, Inc., Burney (Shasta County), Calif., a corporation of New Jersey
Filed Jan. 18, 1963, Ser. No. 252,411
4 Claims. (Cl. 241—190)

The present invention relates to a machine for breaking bark, usually regarded as a waste product in a lumber mill, into useful products and to do so in such a way that there is a reasonable control of particle sizes.

Up until recent years bark from the logs was considered as a waste product in the lumber industry, and was carried by a conveyor or other means to a gigantic Rees Burner, for example, for burning. The bark constituting an enormous volume of waste material which required special equipment for its disposal, and represented a considerable cost which produced no income. Under recent practices it has been the desire of every well run mill to utilize all of the products from the tree, and in the effort to do this there have been many proposals for and attempts to use the bark material, particularly the bark from various pines, spruces and the like. One of the most successful uses is a decorative bark product laid down as walkways, surface coverings and play areas. Normally this requires a particle size of about one inch on the average with a minimum of fines.

Another use for bark products has been as a soil conditioner or a soil additive. In this respect, the bark is of a smaller particle size, roughly around ¼ inch or less, and performs two important functions. One of these is that it loosens and aerates the soil to promote a more vigorous plant growth and root structure. The second is that it has the quality of maintaining the moisture content of the soil in a manner which far exceeds the capabilities of the soil itself.

There are numerous other uses for bark products, all of which require the shattering or cracking of the bark pieces as they come from the mill, into a reasonably uniform size which can be controlled, and all of this without too much handling.

Acordingly, it is an object of the present invention to provide a machine which will receive bark from the mill as a waste product and reduce it to a controlled particle size depending upon the operation of the machine and deliver the bark for sacking without further handling unless the bark itself is to be treated in some special way before sacking.

It is also an object of the present invention to provide a machine for the breaking up of bark waste from a mill which can be regulated simply and directly to crack the waste bark into a pre-determined size particle with substantial uniformity.

It is also an object of the invention to provide a machine which delivers sufficient impact and force without excessive use of power to shatter bark waste into uniform controlled particle sizes.

It is still another object of the present invention to provide a machine which is simple in construction and rugged in operation.

Another object is to provide a machine which will crack the waste bark with the cambrian layer attached just as it comes from the debarker, so that it is not necessary to remove or otherwise treat this layer.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

Figure 2:
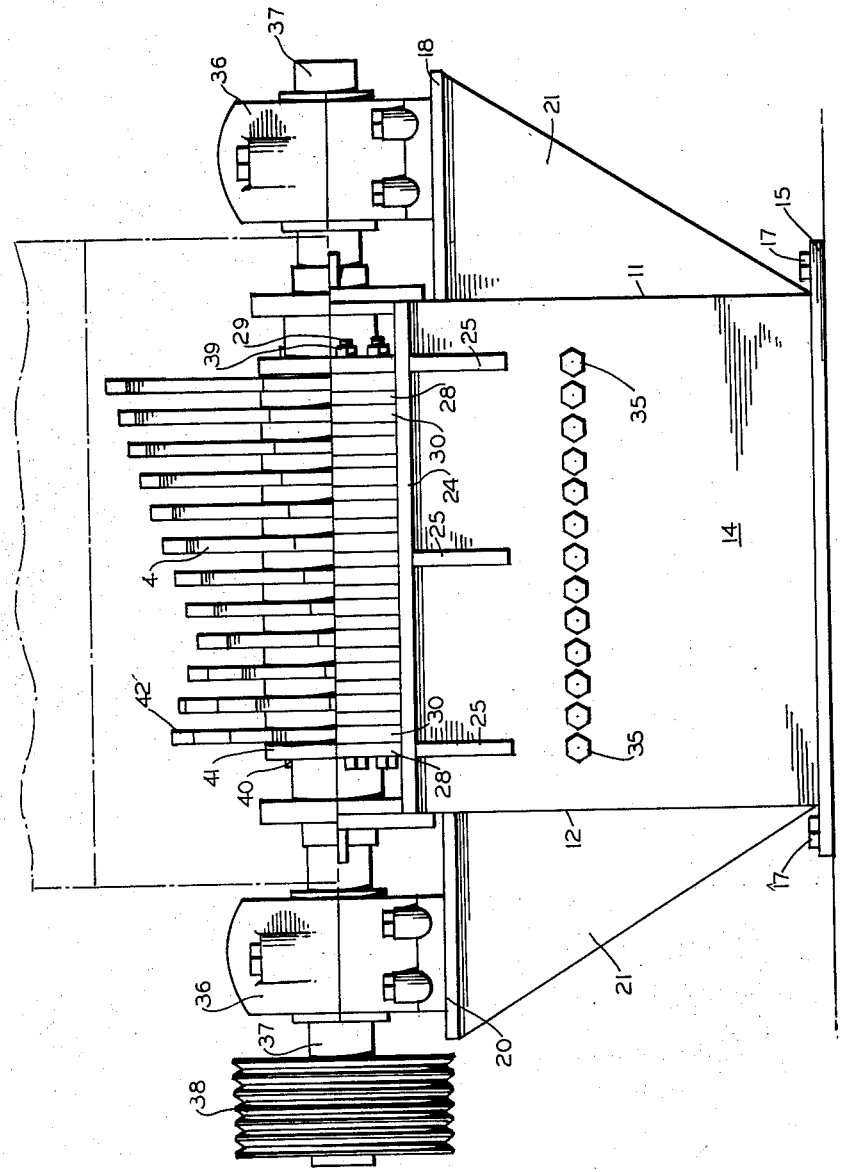

In the drawings:
FIGURE 1 is a top plan view of the bark cracker of the present invention with the protective hood removed;
FIGURE 2 is a front elevational view of the machine with the protective hood being shown only diagrammatically in broken lines;
FIGURE 3 is an exploded side elevational view with the protective hood raised to show the construction of the bladed discs, and also the manner of attachment of the hopper through which the bark waste is supplied to the machine; and
FIGURE 4 is a side elevational view of a single anvil.

Referring now more particularly to the drawings in which like reference numerals indicate like parts in the several views, it will be observed that the main structure of the machine is a hollow rectangle of sturdy construction, open at the top and bottom, having a rear wall 10, side walls 11 and 12 and a front wall 14. These walls are preferably of steel plate and are welded or otherwise suitably secured at their abutting surfaces. The walls 10, 11 and 12 are somewhat higher than the front wall 14 and of lighter gauge, for reasons which will become apparent as the description proceds. Suitable footing plates are welded or otherwise secured at right angles to the vertical faces of the walls 10, 11, 12 and 14 so that they become a continuous outwardly extending flange 15 completely around the perimeter of the machine. The flange may at each of its corners or at any other place if desired, be provided with holes 16 for the purpose of securing the machine firmly to a base by means of bolts 17, or any other suitable holding means.

At each side and secured substantially centrally of the side walls 11 and 12, are outwardly projecting shelves 18 and 20. These shelves are firmly secured to the side walls at right angles thereto and both are in the same horizontal plane, the shelves being equally spaced an appropriate distance from the bottom. The shelves 18 and 20 are intended to overhang the base 15 and are supported by triangular shaped bracket 21. The real wall 10 along its top edge has a cap strip 22 at right angles thereto and this is joined in the same plane with cap strips attached to the sides 11 and 12. The cap strips 23 do not extend the full width of the sides but are broken at the middle portion and continue at the forward end wtih cap plates or strips 23a. The cap strips 22, 23 and 23a form a horizontal outwardly extending flange on three sides of the machine.

As stated earlier, the front wall 14 does not rise vertically as high as the rear wall and is of heavier gauge because of the heavy duty which it performs. It is also provided with a heavy gauge right angled flange or shelf 24 which extends the full width of the front wall member 14. The shelf or flange 24 is supported by a plurality of triangular braces 25 which are secured to the front of the wall 14 and to the lower surface of the shelf 24. The shelf 24 performs the function of positioning and securing a plurality of anvils 26 which are shown positioned in dotted lines in FIGURE 3 and a single anvil is shown in side elevation in FIGURE 4. The anvils are substantially right angled triangles with the apex on the long side cut and squared off as at 27. The right angle triangle of the anvils 26 has an integral rectangular tail portion 28 lying in the same plane as the triangular portion, all of which is shown more detailed in FIGURE 4. The anvils 26 are positioned vertically in place within the hollow rectangle with the long side of the triangle abutting the inside surface of wall 14, and with the bottom edge of the rectangular portion 28 resting on the shelf 24. They are aligned in spaced relation with alternate spacers 30. Both the rectangular portions 28 and the spacers 30 are bored laterally in alignment as at 31 and 32 so that the anvils and spacers may be retained in appropriate position by the draw bolts 29. By pulling up on the nuts 39 it will be observed that the anvil rectangular portions are lined up in a vertical position appropriately spaced by the spacer blocks 30 and maintained in this appropriate alternate arrangement so far as the top portion of the anvils are concerned. The lower ends of the anvils 26 in the flat cut-off portion 27 are drilled and tapped as at 34 to receive the bolts 35. By means of bolts 35 which pass through the front plate 14, the anvils are held in vertical alignment at the bottom. Proper vertical alignment is necessary for reasons which will shortly become apparent. As will be observed in FIGURE 1, the edges of the short side of the anvils 26 present an open grid.

The shelves 18 and 20 support substantial bearing housings 36 in which are journalled the main rotating shaft 37. The shaft 37 may be driven through pulley 38 which is operably attached to a source of power or it may be driven by any other suitable means. Mounted on the shaft and keyed thereto by means of key 40, is an alternate series of spacer discs 41 and bladed discs 42. The bladed discs 42 are solid integral pieces having three blades 43, each having spaced radial cracking faces 44. The opposite side of the blade to the face is represented by an interrupted chord 45 which extends from the perimeter past the center line and a short distance beyond. In the three-bladed disc shown in the drawings, the blades 43 are spaced 120° apart. The bladed discs 42 are arranged longitudinally on the shaft 37 with alternate spacers 41 so that each successive blade face 44 from left to right as viewed in the drawings, is advanced 4°. This provides a helix so that the cracking face 44 of each blade arrives at the grid formed by the several anvils at different times in longitudinal succession. There is also shown a series of twelve bladed discs 42 so that the helix brings into position the first cracking face 44 of the second row in the same relation that the cracking faces of the first series bear to each other. This rotation of the helix makes for an even and continuous cracking without any undue or different load on any one blade in any one of the positions. The bladed discs 42 are of such a thickness as to pass between the grid of the anvils 26 with a slight clearance. The spacer discs 38 not only space these discs axially with respect to the rotating shaft 37, but also produce the vertical alignment of the bladed discs so that they will pass with slight clearance between the anvils 26 in space left by the spacer blocks 30. The proper position on the rotating shaft 37 is not only maintained by the key 40, but by the threaded longitudinal bars 46.

It will be observed from FIGURES 1 and 2 that for greater strength and smoother rotation of the helix of bladed discs, the threaded bars 46 are extended laterally and pass through a disc 48 spaced from either end of the helix and mounted for rotation on the shaft 37. The threaded bars 46 are tightened on the discs 48 by means of nuts 50.

Referring now to FIGURE 3, the protective hood 51 is merely a cover member which has an arcuate cut-out portion 52 at either side to straddle the rotating shaft 37 and the rotating discs 48. The top portion 53 is open for substantially two-thirds of the distance from the front. The front portion of the protective hood 51 is comprised of a heavy gauge plate 54 with an outwardly turned right angle flange 55 which is reinforced by a plurality of triangular shaped braces 56. The other three sides of the protective hood have an outwardly turned right angle flange 57 which is adapted to meet in a face-to-face relationship with the cap plates 22, 23 and 23a. When the hood 51 is in position the flange 57 and the cap plates 22, 23 and 23a are joined together by bolts or by any other suitable means. The heavy front flange 55 is likewise adapted to engage the top edge of the rectangular portions of the anvils 26 together with the spacer blocks. There are aligned holes 58 which pass vertically through the flange 24, the rectangular portions 28 and spacer blocks 30 and the upper flange 55. These are preferably bolted together when the protective hood 51 is in position and the weight thereof holds down the top of the rectangular portions of the anvil against any possible movement in the cracking action.

Attached to the rectangular top opening 53 of the protective hood 51 is any sort of hopper 60 which delivers the bark to the machine.

*Operation*

In operating the machine of the present invention, bark from the debarking area of the mill is delivered to the hopper 60 and falls by gravity through the opening 53 of the protective hood 51. The bladed discs 42 rotate in a clockwise direction as viewed in FIGURE 3, and as the bark is fed in it falls into the helics of the rotating blades. The bark is cracked between the faces 44 of the blades and the top surface 61 of the anvils 26. The cracked particles of bark fall down between the anvils into the open rectangular portion of the machine and are delivered therefrom for further handling.

There are several ways of controlling the particle size. One method is to increase the speed of rotation which increases the shattering effect of the bark pieces which commences even before the bark reaches the anvils. The reverse is also true, that by reducing the speed, the shattering effect is reduced with the result that the particle sizes are larger. The control of the speed of rotation requires no alteration in the machine or the spacing either on the shaft or on the anvils. It is also apparent that control of particle size may be attained by increasing or decreasing the spacing of the spiral hammer made up the bladed discs and spacers. It is a necessary corollary that the spacing of the anvils must be suitably altered to the spacing of the spiral hammer.

It will be observed that the operation of this device and its structural integrity accomplishes all of the objectives as well as others which are readily discernible by those skilled in this art.

I claim:

1. In a machine for cracking bark and other forest products a hollow shell, a drive shaft rotatably mounted at the entrance to said shell, a series of bladed discs mounted alternately with spacers on said shaft for rotation therewith, each disc having a plurality of cracking blades said blades being radially offset and having a flat operating face cooperating with a stationary anvil surface, said discs being mounted on the shaft with the juxtaposed blades in a series of rows axially with respect to said shaft, each row being in the form of a partial turn of a helix, a series of substantially triangular anvils rigidly mounted vertically within said shell with spacers for passing the blades between said anvils with slight clearance and with the short base of the triangle upwardly collectively presenting an anvil surface in a horizontal plane common to the axis of said shaft, said flat operating faces of each blade becoming parallel to the anvil surface in a plane above said surface during rotation, and power means for rotating said shaft and bladed discs.

2. The bark cracking machine of claim 1 wherein the faces of each horizontal row of blades on the several discs are staggered to form a partial turn of a helix, each row being so positioned that the faces of the following row bears the same relative position and function as the predecessor row so that the same relative pressure is continuously applied to the entire anvil surface and including a restricted hopper for feeding the bark as it comes from the debarker, directly to the cracking faces and the anvil.

3. A machine for cracking bark forest products comprising a hollow vertical rectangular shell having a horizontal shelf extending outwardly from one wall thereof and adjacent the top, a hammer rotatably mounted across the top of said shell, said hammer including a shaft, a series of multibladed discs the juxtaposed blades of the several discs forming axial rows each blade having an offset radial flat face cooperating with a stationary anvil surface during rotation, each row of blades being arranged laterally and successively to form a partial turn of a helix, and spacers appropriately spacing each disc from the next, a series of fixed anvils appropriately spaced to pass the blades of a disc therebetween to form a horizontal anvil surface, said radial flat faces of each blade becoming parallel to the anvil surface in a plane above said surface during rotation, said anvils being triangular in shape with an integral square portion adjacent the short base thereof and projecting outwardly therefrom in the same plane, said triangular portion being secured vertically within the rectangular shell adjacent the top thereof and said square portion being secured together and on said horizontal shelf, and power means to drive said hammer.

4. The bark cracking machine of claim 3 wherein the faces of each row of blades are so positioned that the faces of the following row bears the same relative position and function as the predecessor row so that the same relative pressure is continuously applied to the entire anvil surface.

References Cited by the Examiner
UNITED STATES PATENTS

| | | | |
|---|---|---|---|
| 2,865,571 | 12/58 | Ferdon | 241—190 |
| 2,986,347 | 5/61 | Stevenson | 241—190 |

LESTER M. SWINGLE, *Primary Examiner.*